United States Patent Office 3,542,552
Patented Nov. 24, 1970

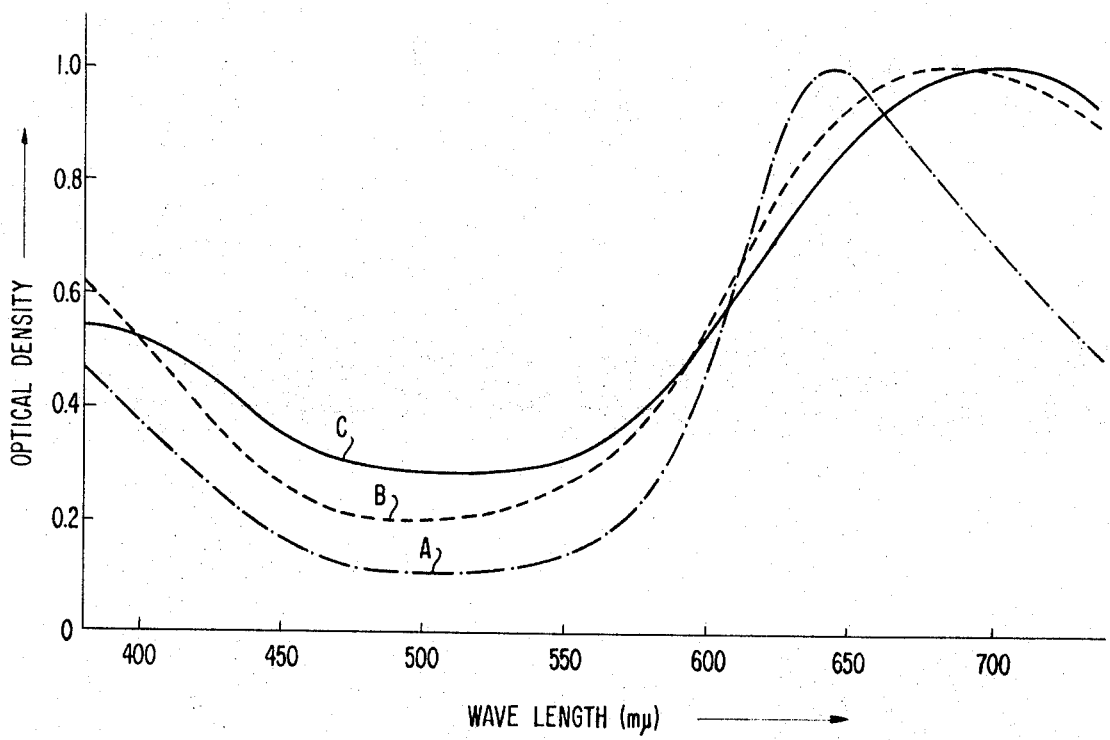

3,542,552
COLOR DEVELOPER FOR COLOR PHOTOGRAPHY
Shiro Kimura, Atsuaki Arai, Kimio Kishimoto, and Isao Shimamura, Kanagawa, Japan, assignors to Fuji Photo Film Co., Ltd., Kanagawa, Japan
Filed Dec. 28, 1967, Ser. No. 694,260
Claims priority, application Japan, Dec. 28, 1966, 42/439
Int. Cl. G03c 7/30, 7/32
U.S. Cl. 96—55                                   2 Claims

ABSTRACT OF THE DISCLOSURE

The present invention relates to a color developer suitable for application in color photography and more particularly to a color developer containing a novel cyan coupler and an aromatic primary amine developing agent.

BACKGROUND OF THE INVENTION

In color photographic development, there are couplers known capable of forming colored images by reaction with the oxidation product of an aromatic primary amine developing agent. The dyes formed by the aforesaid reaction are insoluble in water and usual photographic developing solution, while the silver images formed simultaneously with the dye images during the color development and the unreacted silver halide are removed from the photographic emulsion layers in subsequent processing, whereby the dyes are left in the layers as pure dye images.

Conventional color forming methods for color photography usually comprises a substractive color process and the couplers used in these processes are usually capable of forming a cyan dye, a magenta dye and a yellow dye, respectively. A coupler used for forming a cyan dye image is usually a phenol or a naphthol derivative, which forms a corresponding indoaniline or a corresponding indophenol dye by oxidative coupling with a specific developing agent.

The couplers useful in color photography are usually required to form dyes having a particular desired light transmittance or spectral absorption characteristic. Moreover, the cyan dye or blue-green dye formed must ideally completely absorb red light and at the same time completely transmit blue and green light. Also, it is necessary that these dyes have an excellent fastness to light, heat and humidity, and keep their light transmitting properties for long periods of time. The magenta and yellow dyes must also show these specific light absorption characteristics and light transmittances.

However, many of the conventionally employed cyan couplers are deficient in these properties. Furthermore, many of naphthol and substituted naphthol couplers used as cyan couplers in color photography have excessively high absorption of green and blue light. Moreover, some of them have no desirable red-light absorption characteristics. Among the cyan couplers showing desired red-color absorption characteristics, many are deficient in visibility and in color reproduction as the absorption maximum is shifted to the longer wave side. On the other hand, many of the cyan couplers having the desired red-light absorption characteristics usually require complicated processes for preparation which makes the use of such couplers unprofitable and inefficient due to the restrictions in obtaining raw materials. As examples of known cyan couplers, there may be illustrated 2-(o-acetamino-β-phenylethyl)-1-hydroxynaphthamide (U.S. Pat. No. 3,002,836) and 2 - (o - propioamino-β-phenylethyl)-1-hydroxynaphthamide.

An object of this invention is to provide a color developer containing an aromatic primary amine derivative and a cyan coupler which can easily be prepared with no restrictions in raw materials.

Another object of this invention is to provide a color developer containing an aromatic primary amine derivative and a cyan coupler capable of forming a cyan dye excellent in spectral absorption characteristics necessary for obtaining preferable cyan-colored images and in fastness to light, heat and humidity.

BRIEF DESCRIPTION OF INVENTION

The inventors have found that a 1-hydroxynapthanilide derivative having the substituents mentioned below posses these characteristics as very effective cyan couplers.

That is, the present invention provides a developer for color photography containing a developing agent comprising an aromatic primary amine derivative and a cyan coupler represented by the general formula

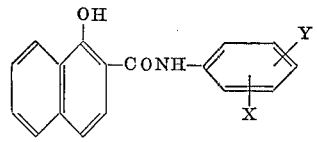

wherein X and Y each represents a hydrogen atom, m-CONHR, p-CONHR, m-NHCONHR, p-NHCONHR, m-NHCOR', and p-NHCOR' wherein R represents a hydrogen atom, a methyl group, and an ethyl group and wherein R' represents a methyl group and an ethyl group. Said X and Y may be the same or different groups but may not both be hydrogen atoms. Said m-NHCOR' or p-NHCOC$_2$H$_5$ may not be substituted for when X or Y is a hydrogen atom.

DETAILED DESCRIPTION OF THE INVENTION

The aforesaid cyan couplers having the above general formula and used in the present invention may be easily prepared in a good yield by the condensation reaction of phenyl-1-hydroxy-2-naphthoate with a substituted aniline. The cyan-colored images formed from the coupler by coupling with the oxidation product of a color developer comprising aromatic primary amines are excellent as compared with those of the prior art conventional ones.

Among cyan couplers conventionally used in a color developer, there are employed phenol and naphthol derivatives and among them, 1-hydroxynaphthanilide and 2-benzyl-1-hydroxynaphthamide are considered to be useful. However, the absorption maximum of the cyan dye formed in an emulsion layer when such a cyan coupler is employed is in a longer wave length region than the absorption necessary for color photography as in the case of using usual cyan couplers. This may be inferred from the absorption curve of solutions and also from an electronical consideration of the dye. Further, there are unnecessary absorptions of blue and green lights in these cyan dyes, rendering the aforesaid anilide or naphthamide unsuitable as cyan couplers.

The cyan couplers used in this invention form cyan dyes having excellent spectral characteristics as shown in accompanying drawings, in which the spectral absorption curve A of the dye image formed by the oxidative coupling of the cyan coupler, 2-(m-N-methyl-carbamidephenyl)-1 - hydroxynaphthamide with a color developing agent, 2-methyl-4-(N-ethyl-N-β-hydroxyethyl)amino aniline is compared with the spectral absorption curve B of the dye image formed by the coupling of a conventional coupler, 2-(o-N-methylcarbamidophenyl)-1-hydroxynaphthamide with the same developing agent as above, and the spectral absorption curve C of the dye image formed by the coupling of a conventional coupler, 2-benzyl-1-hydroxynaphthamide with the same developing agent as above.

It should be understood that even though the spectral absorption maximum of the dye image obtained by using the cyan coupler of this invention is in a shorter wave length reigon that conventional ones illustrated in the drawing, the dye images have less undesirable absorptions in the region from green to blue and hence show preferable and excellent absorption characteristics as photographic dye image. Furthermore, it has been confirmed that the dye images thus obtained have excellent fastness to light, heat and humidity as compared with those of conventional cyan-colored images. For example, dye fading tests were conducted with the cyan color images obtained by the oxidative couplings of two typical cyan couplers of this invention and two conventional cyan couplers with 2-methyl-4-(N-ethyl-N-$\beta$-hydroxyethyl) amino aniline in silver halide gelatin emulsion layers by exposing the dye images to a xenon lamp for 20 hours. The results are shown in the following table, from which it can easily be determined that the couplers of this invention are excellent as compared with the conventional couplers.

| Cyan coupler: | Remaining dye, Percent |
|---|---|
| 2-(m-N-methylcarbamidophenyl) 1-hydroxynaphthamide | 91 |
| 2-(p-acetylaminophenyl)-1-hydroxynaphthamide | 100 |
| 2-(m-acetylaminophenyl)-1-hydroxynaphthamide | 87 |
| 2-benzyl-1-hydroxynaphthamide | 87 |

Moreover, 2-(o-N-methylcarbamidophenyl)-1-hydroxynaphthamide which is an isomer of the coupler of this invention, 2-(m-N-methylcarbamidophenyl)-1 - hydroxynaphthamide is quite different from the latter in properties and shows an absorption in a longer wave length region, which makes the use of the isomer for color photography completely unsuitable. All other cyan couplers of this invention represented by the above-mentioned general formula show properties similar to that of 2-(m-N-methyl-carbamidophenyl) - 1 - hydroxynaphthamide.

Also, the desirability of employing the cyan coupler of the invention from the standpoint of ease of preparation and economy will become apparent by comparison with the method of preparing 2-(o-acetamino-$\beta$-phenylethyl)-1-hydroxynaphthamide as shown in U.S. Pat. No. 3,002,836. In this method, o-nitrophenethylamine is prepared by the N-acetylation and nitration of phenethylamine and condensed with phenyl 1-hydroxynaphthoate followed by the reduction of the nitro group and acetylation to provide the cyan coupler. During the preparation thereof, any o-nitrophenethylamine formed must be separated from the p-isomer by-produced in the reaction.

Also, another process is provided in which o-nitrophenylacetonitrile obtained from o-nitrotoluene and diethyl oxalate is converted into o-acetaminophenylacetonitrile by reduction of the nitro group followed by acetylation. The o-acetaminophenylacetonitrile is then reduced to o-acetaminophenethylamine, which is then condensed with phenyl 1-hyrodxy-naphthoate. However, this process consists of many reaction steps, requires complicated procedures and is unprofitable from the standpoint of raw material costs and overall yields.

On the other hand, the coupler of this invention can easily be prepared in a good yield using inexpensive raw materials as shown below, by a simple process in a reduced period of time.

The cyan coupler, 1-hydroxynaphthanilide derivative used in the present invention is a novel compound and may be prepared as follows:

(a) Preparation of 2-(p-N-methylcarbamidophenyl)-1-hydroxynaphthamide:

A reaction product obtained by heating a mixture of 4-amino-benzoylmethylamide and a slight excess phenyl-1-hydroxy-2-naphthoate at 180° C. in an oil bath was recrystallized from a mixture of ethyl alcohol and dimethyl formamide to provide the subject compound having a melting point of 251° C. in the form of colorless needles in a yield of 88–95%.

Analysis of nitrogen: Found 8.89%, calculated 8.95%.

(b) Preparation of 2-(m-N-methylcarbamidophenyl)-1-hydroxynaphthamide:

The compound was prepared in a yield of 90–92% by the method similar to that of the above example, and having a melting point of 217° C.

Nitrogen analysis: Found 8.54%, calculated 8.75%.

(c) Preparation of 2-(-p-acetylaminophenyl)-1-hydroxynaphthamide:

The compound was prepared by the same procedure as in the case of preparation (a). The yield and the melting point of the compound were 85–93% and 251° C. respectively.

Nitrogen analysis: Found 8.70%, calculated 8.75%.

(d) Preparation of 2-(3',5'-di-N-methylcarbamidophenyl)-1-hydroxynaphthamide:

The compound was prepared as in the case of preparation (a). The yield and the melting point of the compound were 80–90% and above 240° C., respectively.

Nitrogen analysis: Found 11.11%, calculated 11.13%.

(e) Preparation of 2-(p-N-methylcarbamylaminophenyl)-1-hydroxy-naphthamide:

The compound was prepared by the reaction of the 2-(p-amino-phenyl)-1-hydroxynaphthamide prepared by the same procedure as in preparation (a) with methylisocyanate. The yield and the melting point thereof were 80–90% and 225° C., respectively.

Nitrogen analysis: Found 12.30%, calculated 12.52%.

Other couplers of this invention may also be prepared easily by almost same procedures.

The invention will be described by the following nonlimiting examples.

EXAMPLE 1

A photographic light sensitive film, prepared by applying to a film a conventional silver iodo-bromide red-sensitive gelatin emulsion followed by drying was red-exposed through a step wedge, developed for 3 minutes in a black and white photographic developing solution subjected to reversal exposure by red-light, developed for 5 minutes in a cyan developing solution, and washed with water. The photographic film was subjected to silver bleaching by a conventional method and fixed in a hypo-containing fixing solution. By this procedure, a positive image of cyan dye was obtained, the curve of the spectral absorption of which is shown as curve A in the accompanying drawing. Also, the same procedure was repeated using a conventional cyan coupler, 2-(o-N-methylcarbamidophenyl)-1-hydroxynaphthamide or 2-benzyl-1 - hydroxynaphthamide instead of the cyan coupler of this invention, 2-(m-N-methyl-carbamidophenyl)-1-hydroxynaphthamide, and the spectral absorption curve of each dye image thus formed is shown in the drawing as curve B or curve C. As is clear from the drawing, when using the cyan coupler of this invention, the undesirable absorptions in the region of green to blue are less and the dye images obtained are very excellent as photographic dye images although the absorption region thereof is in a shorter wave length side. The compositions of the processing baths used in this example are as follows:

Black and white developer:
    N-methyl-p-aminophenol ½ sulfate—4.5 g.
    Sodium sulfite—70 g.
    Hydroquinone—8 g.
    Sodium carbonate (monohydrate)—20 g.
    Potassium bromide—2.5 g.
    Water to make—1 liter.

Cyan color developer:
    Potassium bromide—3 g.
    Sodium sulfite—10 g.
    Sodium sulfate—50 g.

Potassium thiocyanate—1 g.
Monobenzyl-p-aminophenol—0.5 g.
Methanol—10 ml.
p-Aminophenol—0.1 g.
Sodium hydroxide—3 g.
2-(m-N-methylcarbamidophenyl)-1-
   hydroxynaphthamide—2 g.
Hexylene glycol—10 ml.
2-methyl-4-ethyl-(N-$\beta$-hydroxyethyl)
   aminoaniline sulfate—2 g.
Water to make—1 liter.

EXAMPLE 2

A photographic light sensitive film, prepared by applying a conventional silver iodo-bromide red-sensitive gelatin emulsion to a film followed by drying, was red-exposed through a step wedge, and subjected to the same processings as in Example 1 except that the cyan developer having the following composition was employed instead of the cyan developer described in Example 1 to provide a positive image of cyan dye. The cyan colored image was excellent as in Example 1 and the image had excellent fastness to heat and humidity.

Cyan developer:
   Potassium bromide—2 g.
   Sodium sulfite—10 g.
   Sodium carbonate (monohydrate)—23 g.
   Sodium hydroxide—1.5 g.
   2 - (m-N-methylcarbamidophenyl)-1-hydroxynaphthamide—1.5 g.
   Hexylene glycol—10 ml.
   2-methyl - 4 - N,N - diethylaminoaniline hydrochloride—3 g.
   Water to make—1 liter

EXAMPLE 3

A photographic light sensitive film, prepared by applying a conventional silver iodo-bromide red-sensitive emulsion to a film followed by drying, was red-exposed through a step wedge and processed as in Example 1 while using the cyan developer having the following composition instead of the cyan developer used in the same example and a positive image of cyan dye having good qualities as in Example 1 was obtained.

Cyan developer:
   Potassium bromide—2 g.
   Sodium sulfite—10 g.
   Sodium carbonate (monohydrate)—23 g.
   Sodium hydroxide—1.5 g.
   2-(p-N-methylcarbamidophenyl)-1-hydroxynaphthamide—1.5 g.
   Hexylene glycol—10 ml.
   2-methyl-4-(N-ethyl-N-$\beta$-hydroxyethyl)-aminoaniline sulfate—2 g.
   Water to make—1 liter

EXAMPLE 4

A photographic light sensitive film prepared by applying a conventional silver iodo-bromide red-sensitive gelatin emulsion to a film followed by drying, was red-exposed through a step wedge and processed as in Example 1 while using the cyan developer having the following composition instead of the cyan developer used in the same example, and a positive image of cyan dye as in Example 1 was obtained.

Cyan developer:
   Potassium bromide—2 g.
   Sodium sulfite—10 g.
   Sodium hydroxide—1.5 g.
   2-(m-N-methylcarbamidophenyl)-1-hydroxynaphthamide—1.5 g.
   Sodium carbonate (monohydrate)—23 g.
   Hexylene glycol—10 ml.
   2-methyl-4-(N-ethyl-N-$\beta$-hydroxyethyl)-aminoaniline sulfate—2 g.
   Water to make—1 liter

EXAMPLE 5

A photographic light sensitive film, prepared by applying a conventional silver iodo-bromide red-sensitive emulsion to a film followed by drying was red-exposed through a step wedge and processed as in Example 1 while using the cyan developer having the following composition instead of the cyan developer used in the same example, and a positive image of cyan dye having good qualities as in the same example was obtained.

Cyan developer:
   Potassium bromide—2 g.
   Sodium sulfite—10 g.
   Sodium hydroxide—1.5 g.
   2 - (p - acetylaminophenyl)-1-hydroxynaphthamide—1.5 g.
   Sodium carbonate (monohydrate)—23 g.
   Hexylene glycol—10 ml.
   2-methyl-4-(N-ethyl-N-$\beta$-hydroxyethyl)-aminoaniline sulfate—2 g.
   Water to make—1 liter

EXAMPLE 6

A photographic film prepared by applying a conventional silver iodo-bromide red-sensitive emulsion to a film followed by drying, was red-exposed through a step wedge and processed as in Example 1 while using the cyan developer having the following composition instead of the cyan developer used in the same example and a positive image of cyan dye having good qualities as in Example 1 was obtained.

Cyan developer:
   Potassium bromide—2 g.
   Sodium sulfite—10 g.
   Sodium carbonate (monohydrate)—23 g.
   Sodium hydroxide—2 g.
   2 - (3′,5′-di-N-methylcarbamidophenyl) - 1 - hydroxynaphthamide—1.5 g.
   Hexylene glycol—10 ml.
   2-methyl-4-(N-ethyl-N-$\beta$-hydroxyethyl)-aminoaniline sulfate—2 g.
   Water to make—1 liter

EXAMPLE 7

A usual multiple layer type photographic light-sensitive color film was exposed to light and processed in a black and white photographic developer for 3 minutes, washed with water, subjected to reversal exposure by red light, and then developed for 4 minutes in a cyan developer. Then, the film was washed with water, blue-exposed and developed for 4 minutes in a yellow developer. After washing with water, the film was developed in a black and white developer for 2 minutes, washed with water, then was white-exposed, developed for 4 minutes in a magenta developer, washed with water, and subjected to usual silver bleaching and fixing to provide good color photographic images.

The composition of the black and white developer was same as that in Example 1 and the compositions of the cyan developer, the yellow developer and the magenta developer used in the instant example were as follows:

Cyan developer:
   Potassium bromide—2 g.
   Potassium thiocyanate—2 g.
   Sodium sulfite—5 g.
   Sodium hydroxide—2 g.
   2-(p-N-methylcarbamidophenyl)-1-hydroxynaphthamide—3 g.
   Hexylene glycol—10 ml.
   2-methyl-4-(N-ethyl-N-$\beta$-hydroxyethyl)-aminoaniline sulfate—1.5 g.
   Water to make—1 liter Yellow developer:
  Potassium bromide—2 g.
  Sodium sulfite—5 g.
  Sodium hydroxide—2 g.
  Benzoylacetanilide—1.5 g.
  4-N,N-diethylaminoaniline hydrochloride—1.5 g.
  Water to make—1 liter
Magenta developer:
  Potassium bromide—2 g.
  Sodium sulfite—5 g.
  Sodium hydroxide—2 g.
  1-phenyl-3-(4-chlorobenzamido)-5-pyrazolone—1.5 g.
  2 - methyl - 4 - N,N-diethylaminoaniline hydrochloride—1.5 g.
  Water to make—1 liter

What is claimed is:
1. A color developer for color photography containing an aromatic primary amine developing agent and the cyan coupler represented by the general formula

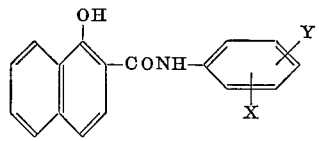

wherein X and Y each represents a member selected from the group consisting of a hydrogen atom, m-CONHR, p-CONHR, m-NHCONHR, p-NHCONHR, m-NHCOR′, and p-NHCOR′ wherein R represents a member selected from the group consisting of a hydrogen atom, a methyl group and an ethyl group, and wherein R′ represents a member selected from the group consisting of a methyl group and an ethyl group, provided that said X and Y may be the same or different but may not both be hydrogen atoms, and said m-NHCOR′ or p-NHCOC$_2$H$_5$ is not substituted when one of X and Y is a hydrogen atom.

2. The color developer according to claim 1 wherein said cyan coupler is selected from 2-(m-N-methylcarbamidophenyl)-1-hydroxynaphthamide, 2-(p-N-methylcarbamidophenyl)-1-hydroxynaphthamide, 2 - (p-acetylaminophenyl)-1-hydroxynaphthamide, and 2-(3′,5′-di-N-methylcarbamidophenyl)-1-hydroxynaphthamide.

References Cited
UNITED STATES PATENTS

| | | | |
|---|---|---|---|
| 2,295,009 | 9/1942 | Porter et al. | 96—55 |
| 2,313,586 | 3/1943 | Salminen et al. | 96—55 |
| 3,002,836 | 10/1961 | Vittum et al. | 96—56.6 |
| 3,226,230 | 12/1965 | Poucke et al. | 96—22 |
| 3,418,121 | 12/1968 | Yoshida et al. | 96—55 |
| 3,458,315 | 7/1969 | Loria | 96—55 |
| 3,458,574 | 7/1969 | Anselm et al. | 96—55 X |

WILLIAM D. MARTIN, Primary Examiner

T. G. DAVIS, Assistant Examiner